M. W. SMITH.
BOLT AND NUT LOCK FOR CONNECTING RODS.
APPLICATION FILED JULY 7, 1908.
945,110.
Patented Jan. 4, 1910.
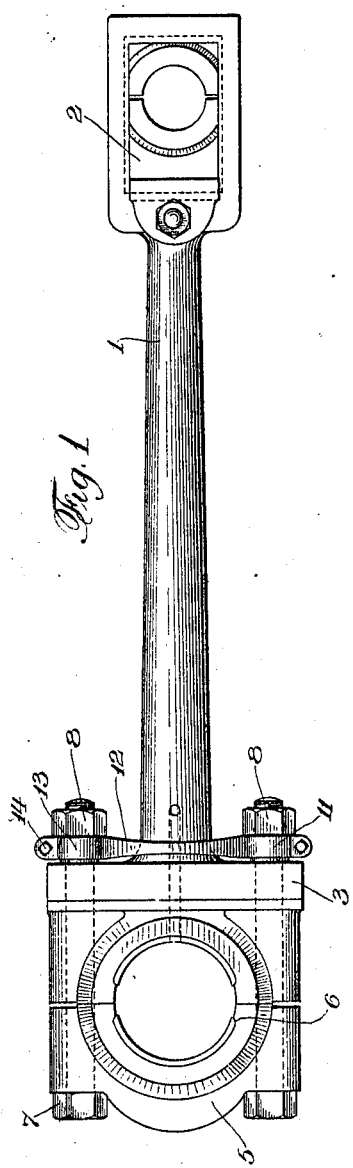
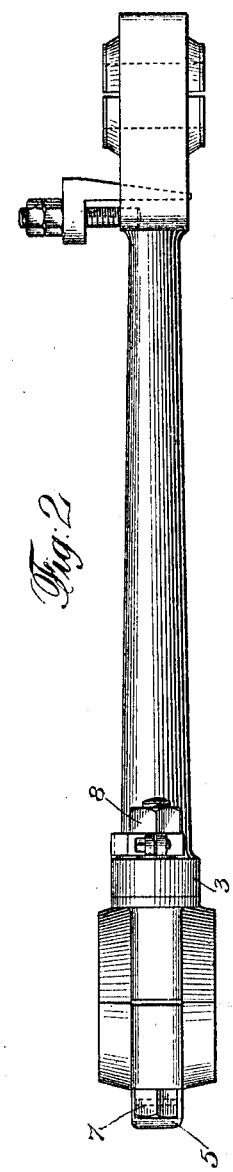
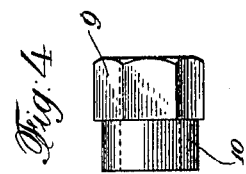
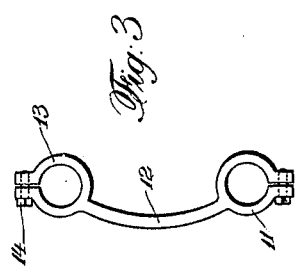
Witnesses:
M. Meikle
J. Newcomb
Inventor
Merritt W. Smith
By his Attorneys
Prindle & Wright

UNITED STATES PATENT OFFICE.

MERRITT W. SMITH, OF TROY, PENNSYLVANIA.

BOLT AND NUT LOCK FOR CONNECTING-RODS.

945,110.  Specification of Letters Patent.  Patented Jan. 4, 1910.

Application filed July 7, 1908. Serial No. 442,400.

*To all whom it may concern:*

Be it known that I, MERRITT W. SMITH, of Troy, in the county of Bradford and State of Pennsylvania, have invented a certain new and useful Improvement in Bolt and Nut Locks for Connecting-Rods, and do hereby declare that the following is a full and exact description thereof.

My invention relates to an improvement in nut locks and especially to locks for nuts used upon bolts carried by connecting rods in engines. It is capable, however, of application to other devices with almost, if not quite, the same advantages.

Hitherto it has been customary in practice to secure the bolts used in connecting rods for securing the boxes on the ends thereof firmly together, to insert an auxiliary screw adjacent to each of the bolts and at right angles thereto, so as to secure the said bolts in any adjusted position. It has been found especially desirable, however, to avoid the tendency which is always present in such construction of a mechanic to overlook the locking screws when once the main bolts have been adjusted; and to this end it has been found especially desirable to secure the boxes on the end of a connecting rod by means of bolts, the heads of which are situated upon the cap, while the nuts thereof are situated on the inner surface of the T-shaped extension of the connecting rod. In order to secure the latter nuts in any position into which they have been moved, I provide a locking mechanism which extends around the body of the connecting rod and clasps each of the said nuts on either side thereof.

In the accompanying drawings Figure 1 is a vertical elevation of a connecting rod equipped with my nut locking device; Fig. 2 is a plan view of the same; Fig. 3 is a plan view of the yoke which I use in my locking device; and Fig. 4 is a plan view of one of the nuts coöperating with the yoke.

In the drawings 1 is a connecting rod provided at one end with the usual opening for receiving the adjustable blocks 2 which fit around a wrist pin connected to the cross head of the engine. The other end of the connecting rod 1 is provided with a T-shaped extension 3 having in either end thereof a bolt opening 4. A cap 5 having a journal box 6 of the usual type is secured to the said T-shaped extension 3 by means of bolts 7 extending through appropriate bolt holes alining with the bolt openings 4 in the T-shaped extension 3 above referred to. These bolts carry on their inner ends the nuts 8 shown in detail in Fig. 4. These nuts are provided with the usual hexagonal portion 9 and an inner cylindrical portion 10. The yoke 11 having a curved portion 12 for the purpose of extending around the body of the connecting rod 1, is provided at each end with a split ring 13 having a set screw 14 for adjusting and tightening up the same, the purpose of the split rings being to extend around the cylindrical portions 10 of the nuts 8.

In the operation of the device, the bolts 7 are extended through the openings provided therefor in the cap 5 and through the openings 4 situated in the T-shaped extension of the connecting rod 1. The yoke 12 is then placed around the connecting rod 1 and the split rings 13 are placed over the ends of the said bolts 7. When the nuts are now screwed upon the bolts 7, the inner cylindrical portions 10 thereof will extend into and fit closely within the split rings 13, and after the nuts have been tightened as much as desired, the set screws 14 in the ends of the split rings are screwed up to secure the nuts in their adjusted and tightened positions.

An arrangement such as this readily permits a rapid adjustment of the nuts, inasmuch as the split rings 13 can be quickly loosened by unscrewing the set screws 14. At the same time there would be absolutely no tendency for the nuts to slip within the split rings 13 because of the very long frictional surface with which each of the cylindrical portions 10 is in contact within the split ring. It will be noted also that by the location of the yoke behind the T-shaped extension of the connecting rod, a very convenient and compact structure is produced, which is also as free as possible from vibration.

A nut lock of the kind described is capable of many applications. The principle therein involved could be equally well applied to the locking of a single nut and the locking of a single nut or two nuts in the manner described could, of course, be applied to numerous other structures than engines.

The locking device is obviously equally adaptable to the locking of nuts or bolt heads in position.

I claim—

1. In a device of the character described, the combination of a connecting rod, bolts located in an extension on either side thereof, nuts thereon having cylindrical portions, and a yoke extending around the said rod and coöperating with the cylindrical portions to lock the nuts in place.

2. In a device of the character described, the combination of a connecting rod, bolts located in an extension on either side thereof, nuts thereon having cylindrical portions, and a yoke having split rings on its ends extending around the said rod and coöperating with the cylindrical portions to lock the nuts in place.

3. In a device of the character described, the combination of a connecting rod, journal boxes on the end thereof, a plurality of bolts for securing the same in position located on opposite sides of the connecting rod, and a single integral split ring device extended around the connecting rod for simultaneously securing the bolts in any adjusted position.

In testimony that I claim the foregoing I have hereunto set my hand.

MERRITT W. SMITH.

In presence of—
  H. K. MITCHELL,
  W. H. PARSONS.